(12) United States Patent
Wang et al.

(10) Patent No.: US 11,573,376 B2
(45) Date of Patent: Feb. 7, 2023

(54) CONNECTOR FOR PHOTOELECTRIC HYBRID IN FREE SPACE OF MAGNETIC ABSORPTION

(71) Applicant: HANGZHOU MO-LINK TECHNOLOGY CO. LTD, Hangzhou (CN)

(72) Inventors: Hao Wang, Hangzhou (CN); Dong Wang, Hangzhou (CN)

(73) Assignee: HANGZHOU YAOXIN TECHNOLOGY CO., LTD, Hangzhou (CN)

( * ) Notice: Subject to any disclaimer, the term of this patent is extended or adjusted under 35 U.S.C. 154(b) by 0 days.

(21) Appl. No.: 17/389,713

(22) Filed: Jul. 30, 2021

(65) Prior Publication Data

US 2022/0082764 A1    Mar. 17, 2022

(30) Foreign Application Priority Data

Sep. 14, 2020 (CN) .......................... 202010962726.9

(51) Int. Cl.
*G02B 6/32* (2006.01)
*G02B 6/38* (2006.01)
(Continued)

(52) U.S. Cl.
CPC ............. *G02B 6/3817* (2013.01); *G02B 6/32* (2013.01); *G02B 6/3853* (2013.01); *G02B 6/3882* (2013.01); *G02B 6/3886* (2013.01); *G02B 6/3885* (2013.01); *H01R 13/2471* (2013.01); *H01R 13/6205* (2013.01); *H01R 13/631* (2013.01)

(58) Field of Classification Search
CPC ...... G02B 6/32; G02B 6/3817; G02B 6/3853; G02B 6/3882; G02B 6/3885; G02B 6/3886; H01R 13/2471; H01R 13/6205; H01R 13/631; H01R 24/00
See application file for complete search history.

(56) References Cited

U.S. PATENT DOCUMENTS

| 8,781,273 | B2* | 7/2014 | Benjamin | ............ | G02B 6/4204 |
| | | | | | 385/33 |
| 10,025,042 | B2* | 7/2018 | Isenhour | ............... | G02B 6/3849 |

(Continued)

*Primary Examiner* — Ryan A Lepisto
(74) *Attorney, Agent, or Firm* — Li & Cai Intellectual Property (USA) Office

(57) ABSTRACT

The present disclosure relates to the field of communication technology, and provides a connector for photoelectric hybrid in free space of magnetic absorption comprising matching a male connector and a female connector and provided with a conductive pin and an electrical contact used for conduction, an optical communication module for optical communication and comprising optical fiber connector and lens capable of expanding the light beam output to each other, a spacing formed between the two lenses, and the male connector and the female connector aligned and remained in a plug-in state through a magnetic field. Furthermore, a guiding structure is provided to embody precise alignment of the lens of the male connector and the lens of the female connector. The connector can transmit both optical signals and electrical signals, and has the characteristics of high processing yield, high reliability, and convenient use.

9 Claims, 4 Drawing Sheets

(51) Int. Cl.
  *H01R 13/24* (2006.01)
  *H01R 13/62* (2006.01)
  *H01R 13/631* (2006.01)

(56) References Cited

U.S. PATENT DOCUMENTS

| 10,185,094 B2* | 1/2019 | Isenhour | G02B 6/3886 |
| 2011/0229090 A1* | 9/2011 | Isenhour | G02B 6/4246 |
| | | | 385/78 |

* cited by examiner

CONNECTOR FOR PHOTOELECTRIC HYBRID IN FREE SPACE OF MAGNETIC ABSORPTION

FIELD OF THE DISCLOSURE

The present disclosure relates to the field of communication technology, and in particular, to a connector for photoelectric hybrid in free space of magnetic absorption.

BACKGROUND OF THE DISCLOSURE

In the field of communications, especially in the field of consumer products, such as smart terminals such as laptops, computers, TVs, and mobile phones, copper wires are configured to transmit signals and data in traditional applications. In order to meet the increasing transmission capacity and high-speed transmission requirements, the inventor has invented a communication method that replaces traditional cables, and has successively filed the following Chinese patent applications: 1. Communication terminal based on free space optical communication, communication device and communication system, of which the publication number is CN109586790A and 2. Optical fiber connection optical component, of which the publication number is CN110780391A.

On this basis, the inventor further studied, and provides a connector for photoelectric hybrid in free space of magnetic absorption.

SUMMARY OF THE DISCLOSURE

The purpose of the present disclosure is to provide a connector for photoelectric hybrid in free space of magnetic absorption with high processing yield, high reliability and convenient use.

To achieve the above objectives, the technical solutions adopted by the present disclosure are as follows.

The connector for photoelectric hybrid in free space of magnetic absorption of the present disclosure is composed of a male connector and a female connector, and the two are used in conjunction.

A female connector for photoelectric hybrid in free space of magnetic absorption is provided, comprising: a first insulating base body having a receptacle formed at a front end of the first insulating base body; a conductive pin and a first optical communication module provided at a back portion of the receptacle; and a first alignment and holding mechanism provided on the first insulating base body and configured to align the female connector and a corresponding male connector through a magnetic field before plugging and remain the female connector and the corresponding male connector in a plug-in state through the magnetic field after plugging; wherein, the first optical communication module comprises: a first optical fiber connector for carrying optical fibers; and a first lens provided at a light-emitting end of the first optical fiber connector and configured to expand a light beam transmitted from the female connector to the corresponding male connector, wherein a position of the first lens is arranged in the plug-in state such that a certain spacing is provided between the first lens and a second lens of the corresponding male connector.

In a preferred embodiment, the female connector for photoelectric hybrid in free space of magnetic absorption further comprises: a plurality of first positioning rods arranged on the first lens and the first optical fiber connector from different positions and configured to align the first lens and the first optical fiber connector; and a guiding part for guiding the second lens to align with the first lens.

In a preferred embodiment, the conductive pin is an elastic pin with a built-in spring.

In a preferred embodiment, the first alignment and holding mechanism comprises a plurality of magnets, and the plurality of magnets are arranged at a front end of the first insulating base body corresponding to a periphery of the receptacle.

In a preferred embodiment, the first optical communication module is arranged in a center of the back portion of the receptacle, the conductive pin comprises a first set of pins and a second set of pins, the first set of pins and the second set of pins are symmetrical with respect to the first optical communication module, and the second set of pins are configured to carry a same signal as the first set of pins.

In a preferred embodiment, the first insulating base body is configured as a long strip structure, a reception direction of the female connector by the corresponding male connector is arranged to be perpendicular to a long side of the first insulating base body, and the receptacle is arranged in a middle of a front end of the first insulating base body.

A male connector for photoelectric hybrid in free space of magnetic absorption is provided, comprising: a second insulating base body having a plug-in convex portion formed at a front end of the first insulating base body, wherein the plug-in convex portion is configured to match a receptacle of a corresponding female connector; an electrical contact and a second optical communication module provided at a front end of the plug-in convex portion; and a second alignment and holding mechanism provided on the second insulating base body and configured to align the male connector and a corresponding female connector through a magnetic field before plugging and remain the female connector and the corresponding male connector in a plug-in state through the magnetic field after plugging; wherein, the second optical communication module comprises: a second optical fiber connector for carrying optical fibers; and a second lens provided at a light-emitting end of the second optical fiber connector and configured to expand a light beam transmitted from the male connector to the corresponding female connector, wherein a position of the second lens is arranged in the plug-in state such that a certain spacing is provided between the second lens and a first lens of the female connector.

In a preferred embodiment, the male connector for photoelectric hybrid in free space of magnetic absorption further comprises: a plurality of second positioning rods arranged on the second lens and the second optical fiber connector from different positions and configured to align the second lens and the second optical fiber connector; and a guiding and matching for guiding the first lens to align with the second lens.

In a preferred embodiment, the second alignment and holding mechanism comprises a plurality of magnets, and the plurality of magnets are arranged at a front end of the second insulating base body corresponding to a periphery of the plug-in convex portion.

In a preferred embodiment, the second insulating base body is configured as a long strip structure, an insertion direction of the male connector into the corresponding female connector is arranged to be perpendicular to a long side of the second insulating base body, and the plug-in convex portion is arranged in a middle of a front end of the second insulating base body.

In a preferred embodiment, the second optical communication module is configured in a center of a front end of the plug-in convex portion, the electrical contact comprises a first set of contacts and a second set of contacts, the first set of contacts and the second set of contacts are symmetrical with respect to the second optical communication module, and the second set of contacts are configured to carry a same signal as the first set of contacts.

Compared with the prior art, the present disclosure has at least the following beneficial effects.

The present disclosure can transmit both optical signals and electrical signals.

The female connector and the male connector are optically connected through free space, and are equipped with a lens for expanding the light beam transmitted to the other party, so that the tolerance of the optical path to dimensional tolerance and the tolerance of pollutants is high, and the connector has the characteristics of high processing yield and high reliability.

The present disclosure is equipped with an alignment and holding mechanism using the action of a magnetic field, which aligns the female connector with the corresponding male connector before plugging, and remains the female connector and the corresponding male connector in the plug-in state after plugging. Therefore, the present disclosure not only has the characteristics of convenient plugging and separation, but also can avoid signal instability caused by loose cooperation between the receptacle and the plug-in convex portion.

The guiding part and the guiding and matching are further provided, so that the lens of the male connector and the lens of the female connector can be guided to align during the plugging process.

DETAILED DESCRIPTION OF THE EXEMPLARY EMBODIMENTS

The present disclosure will be further described below in conjunction with the drawings and embodiments.

Figure 1:
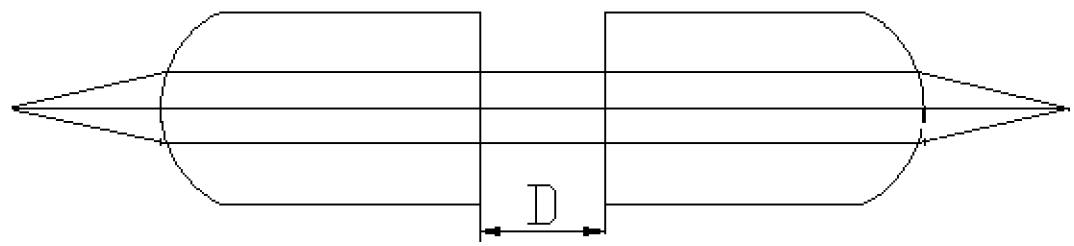
FIG. 1 is a schematic diagram of the optical path structure between optical communication modules.

FIG. 1 is a schematic diagram of the optical path structure between the optical communication modules of the present disclosure, where D is the distance between two lenses (that is, the lens of the male connector and the lens of the female connector), which is configured to embody the free space of the optical signal connection.

The first embodiment: a female connector for photoelectric hybrid in free space of magnetic absorption. For the convenience of description, some parts of this application are referred to as female connectors for short.

Figure 2:
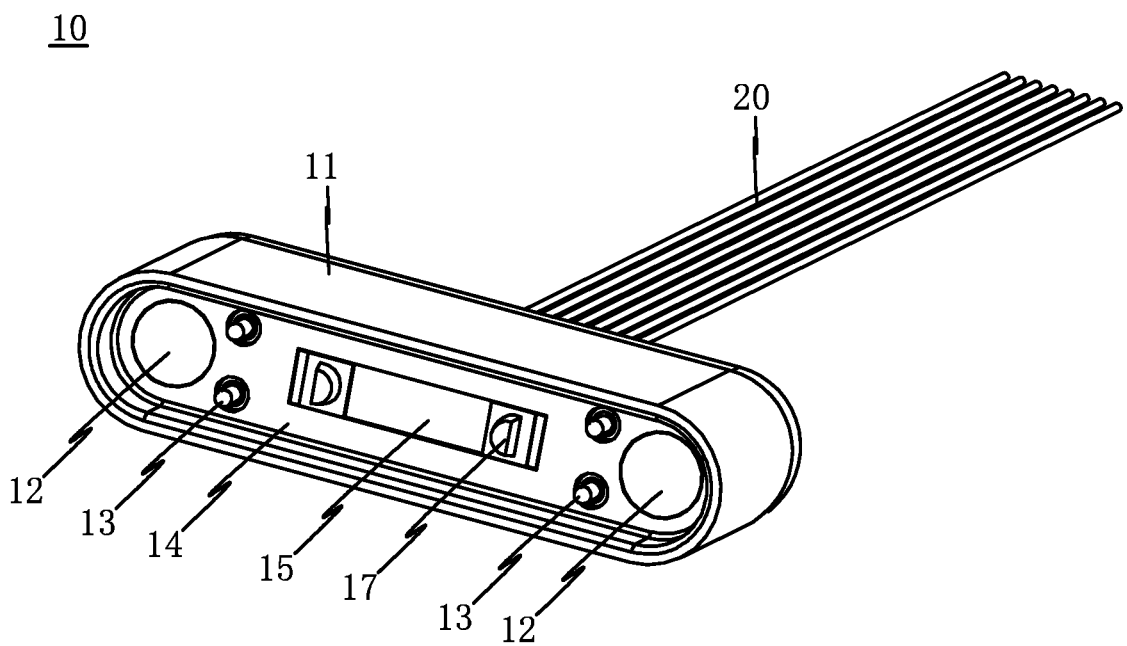
FIG. 2 is a perspective view of the female connector.
Figure 3:
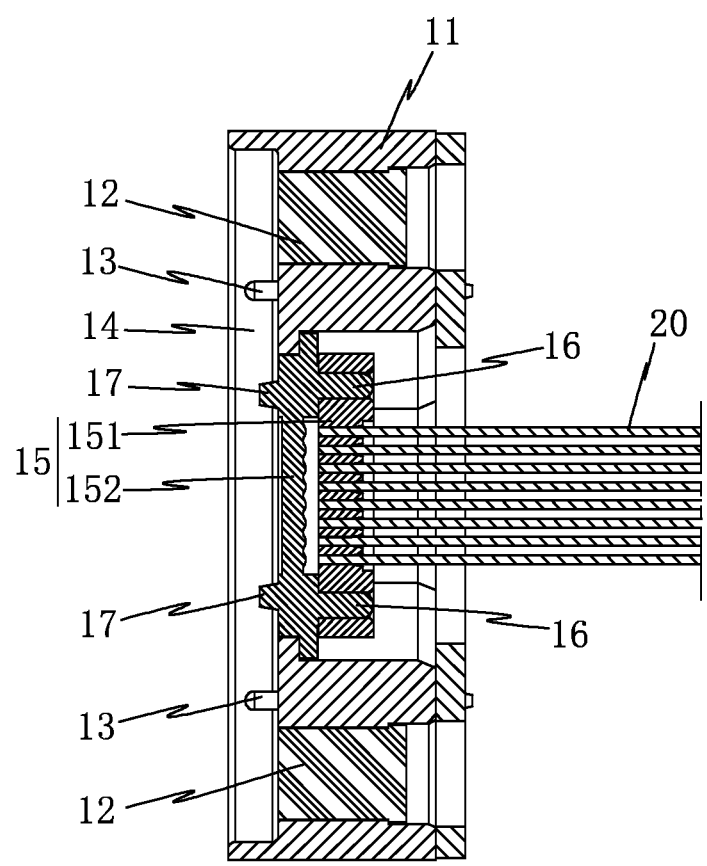
FIG. 3 is a cross-sectional view of the female connector.

Reference is made to FIG. 2 and FIG. 3. The female connector 10 comprises: a first insulating base body 11 having a receptacle 14 formed at a front end of the first insulating base body; a conductive pin 13 and a first optical communication module 15 provided at a back portion of the receptacle 14; and a first alignment and holding mechanism 12 provided on the first insulating base body 11 and configured to align the female connector 10 and a corresponding male connector 40 through a magnetic field before plugging (referring to FIG. 4 and FIG. 5) and remain the female connector and the corresponding male connector in a plug-in state through the magnetic field after plugging; wherein, the first optical communication module 15 comprises: a first optical fiber connector 151 for carrying optical fibers; and a first lens 152 provided at a light-emitting end of the first optical fiber connector 151 and configured to expand a light beam transmitted from the female connector 10 to the corresponding male connector 40, wherein a position of the first lens 152 is arranged in the plug-in state such that a certain spacing is, as D shown in FIG. 1, provided between the first lens 152 and a second lens 452 of the corresponding male connector 40 (referring to FIG. 5).

The conductive pin 13 and the first insulating base body 11, and the first optical fiber connector 151 and the first insulating base body 11 can be fixed together by glue, welding or mechanical structure. The optical fiber 20 is generally fixed to the first optical fiber connector 151 by using thermal curing adhesive 353ND or ultraviolet curing adhesive, and the end surface needs to be ground, polished, and cut. The optical fiber 20 may be a glass optical fiber or a plastic optical fiber.

As shown in FIG. 3, the female connector 10 of the present embodiment further comprises a plurality of first positioning rods 16 arranged on the first lens 152 and the first optical fiber connector 151 from different positions and configured to align the first lens 152 and the first optical fiber connector 151. A guiding part 17 for guiding the second lens 452 to align with the first lens 152 is provided at a front end of the first lens 152.

In this embodiment, the guiding part 17 is implemented as a convex portion whose diameter gradually increases from the head to the root. In this embodiment, the first positioning rod 16, the guiding part 17 and the first lens 152 are integrally formed.

In this embodiment, the conductive pin 13 adopts an elastic pin with a built-in spring. The use of elastic pin makes the connection with the electrical contact 43 of the male connector 40 more reliable.

As shown in FIG. 3, in this embodiment, the first alignment and holding mechanism 12 is two magnets, and the two magnets are arranged at the front end of the first insulating base body 11 corresponding to the periphery of the receptacle 14. The magnet and the first insulating base body 11 can be fixed together with glue or a mechanical structure.

As shown in FIG. 2 and FIG. 3, in this embodiment, the first optical communication module 15 is arranged in a center of the back portion of the receptacle 14, the conductive pin 13 comprises a first set of pins and a second set of pins, in which two pins are in each set, the first set of pins and the second set of pins are symmetrical with respect to the first optical communication module 15, and the second set of pins are configured to carry a same signal as the first set of pins. In this embodiment, no matter whether the male connector 40 is inserted into the female connector 10 in the forward direction or the female connector 10 is inserted in the reverse direction, it has the same connection effect, which can make the user's usage more convenient and have a better experience.

Reference is made to FIG. 2. In this embodiment, the first insulating base body 11 is configured as a long strip structure, a reception direction of the female 10 by the corresponding male connector 40 is arranged to be perpendicular to a long side of the first insulating base body (11), and the receptacle 14 is constructed in a middle of a front end of the first insulating base body 11.

The second embodiment: a male connector for photoelectric hybrid in free space of magnetic absorption. For the convenience of description, some parts of this application are referred to as male connectors for short.

Figure 4:
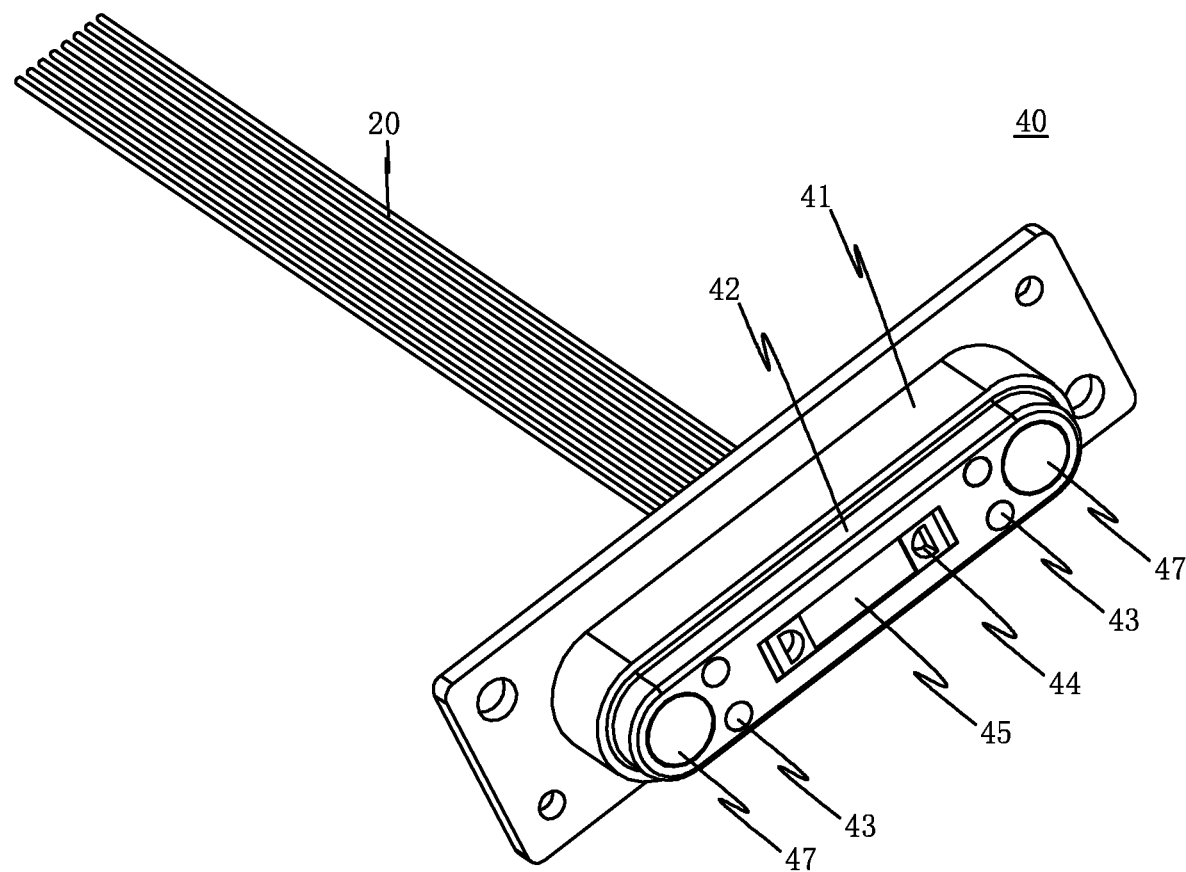
FIG. 4 is a perspective view of the male connector.

Reference is made to FIG. 4. The male connector 40 comprises: a second insulating base body 41 having a plug-in convex portion 42 formed at a front end of the first insulating base body, wherein the plug-in convex portion 42 is configured to match a receptacle 14 of a corresponding female connector 10; an electrical contact 43 and a second optical communication module 45 provided at a front end of the plug-in convex portion 42; and a second alignment and holding mechanism 47 provided on the second insulating base body 41 and configured to align the male connector 40 and a corresponding female connector 10 through a magnetic field before plugging (referring to FIG. 2 and FIG. 3) and remain the female connector 10 and the corresponding male connector 40 in a plug-in state through the magnetic field after plugging; wherein, the second optical communication module 45 comprises: a second optical fiber connector 451 for carrying optical fibers; and a second lens 452 provided at a light-emitting end of the second optical fiber connector 451 and configured to expand a light beam transmitted from the male connector 40 to the corresponding female connector 10, wherein a position of the second lens 452 is arranged in the plug-in state such that a certain spacing is, as D shown in FIG. 1, provided between the second lens 452 and a first lens 152 of the female connector 10 (referring to FIG. 3).

The electrical contact 43 adopts a conductive column structure, and the electrical contact 43 and the second insulating base body 41, the second optical fiber connector 451 and the second insulating base body 41 can be fixed together by glue, welding or mechanical structure. The optical fiber is generally fixed to the second optical fiber connector 451 by using thermal curing adhesive 353ND or ultraviolet curing adhesive, and the end surface needs to be ground, polished, and cut. The optical fiber may be a glass optical fiber or a plastic optical fiber.

Figure 5:
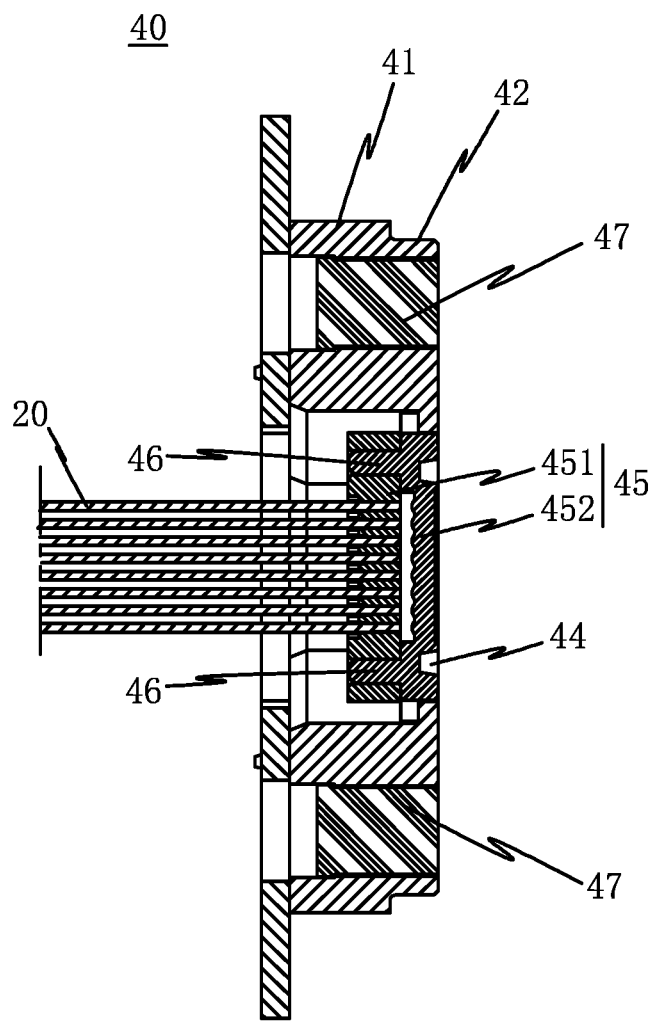
FIG. 5 is a cross-sectional view of the male connector.
Reference numeral: 10. female connector; 20. optical fiber; 40. male connector; D. Spacing; 11. first insulating base body; 12. first alignment and holding mechanism; 13. conductive pin; 14. receptacle; 15. first optical communication module; 151. first optical fiber connector; 152. first lens; 16. first positioning rod; 17. guiding part; 41. second insulating base body; 411. outer shell; 412. inner shell; 413. plug connector; 42. plug-in convex portion; 43. electrical contact; 44. guiding and matching part; 45. second optical communication module; 451. second optical fiber connector; 452. second lens; 46. second positioning rod; 47. second alignment and holding mechanism.

As shown in FIG. 5, the male connector 40 of the present embodiment further comprises a plurality of second positioning rods 46 arranged on the second lens 452 and the second optical fiber connector 451 from different positions and configured to align the second lens 452 and the second optical fiber connector 451. A guiding and matching part 44 for cooperating with the guiding part 17 (referring to FIG. 3) and guiding the first lens 152 to align with the second lens 452 is provided at the front end of the second lens 452. In this embodiment, the guiding and matching part 44 is embodied as a concave portion whose diameter gradually decreases from the mouth to the bottom.

As shown in FIG. 5, in this embodiment, the second alignment and holding mechanism 47 is two magnets, and the two magnets are arranged at the front end of the first second base body 41 corresponding to the periphery of the plug-in convex portion 42.

As shown in FIG. 4, in this embodiment, the second insulating base body 41 is configured as a long strip structure, an insertion direction of the male connector 40 into the corresponding female connector 10 is arranged to be perpendicular to a long side of the second insulating base body 41, and the plug-in convex portion 42 is constructed in a middle of a front end of the second insulating base body 41.

As shown in FIG. 4 and FIG. 5, the second optical communication module 45 is configured in a center of a front end of the plug-in convex portion 42, the electrical contact 43 comprises a first set of contacts and a second set of contacts, in which two contacts are in each set, the first set of contacts and the second set of contacts are symmetrical with respect to the second optical communication module 45, and the second set of contacts are configured to carry a same signal as the first set of contacts.

In this embodiment, whether the male connector 40 is inserted into the female connector 10 in the forward direction or the female connector 10 is inserted in the reverse direction, it has the same connection function, which can make the user's usage more convenient and have a better experience.

The connector for photoelectric hybrid in free space of magnetic absorption of the present disclosure has at least the following beneficial effects.

1. The present disclosure can transmit both optical signals and electrical signals.

2. The female connector 10 and the male connector 40 are optically connected through free space, and are equipped with a lens for expanding the light beam transmitted to the other party, so that the tolerance of the optical path to dimensional tolerance and the tolerance of pollutants is high, and the connector has the characteristics of high processing yield and high reliability.

3. The present disclosure is equipped with an alignment and holding mechanism using the action of a magnetic field, which aligns the female connector 10 with the corresponding male connector 40 before plugging, and remain the female connector 10 and the corresponding male connector 40 in the plug-in state after plugging. Therefore, the present disclosure not only has the characteristics of convenient plugging and separation, but also can avoid signal instability caused by loose cooperation between the receptacle 14 and the plug-in convex portion 42.

4. The guiding part 17 and the guiding and matching 44 are further provided, so that the lens of the male connector and the lens of the female connector can be guided to align during the plugging process.

The present disclosure has been described in detail through specific embodiments above. These detailed descriptions are only limited to helping those skilled in the art understand the content of the present disclosure, and should not be construed as limiting the protection scope of the present disclosure. Various modifications, equivalent transformations, etc. performed by those skilled in the art to the above solutions under the concept of the present disclosure should be included in the protection scope of the present disclosure.

What is claimed is:

1. A female connector (10) for photoelectric hybrid in free space of magnetic absorption, comprising:
a first insulating base body (11) having a receptacle (14) formed at a front end of the first insulating base body (11);
a conductive pin (13) and a first optical communication module (15) provided at a back portion of the receptacle (14); and a first alignment and holding mechanism (12) provided in the first insulating base body (11), and configured to align the female connector (10) and a corresponding male connector (40) through a magnetic field before plugging and remain the female connector (10) and the corresponding male connector (40) in a plug-in state through the magnetic field after plugging;

wherein, the first optical communication module (15) comprises:

a first optical fiber connector (151) for carrying optical fibers; and a first lens (152) provided at a light-emitting end of the first optical fiber connector (151) and configured to expand a light beam transmitted from the female connector (10) to the corresponding male connector (40), wherein a position of the first lens (152) is arranged in the plug-in state such that a certain spacing (D) is provided between the first lens (152) and a second lens (452) of the corresponding male connector (40);

wherein the first optical communication module (15) is arranged in a center of the back portion of the receptacle (14), the conductive pin (13) comprises a first set of pins and a second set of pins, the first set of pins and the second set of pins are symmetrical with respect to the first optical communication module (15), and the second set of pins are configured to carry a same signal as the first set of pins.

2. The female connector (10) according to claim 1, further comprising:

a plurality of first positioning rods (16) arranged on the first lens (152) and the first optical fiber connector (151) from different positions and configured to align the first lens (152) and the first optical fiber connector (151); and a guiding part (17) for guiding the second lens (452) to align with the first lens (152).

3. The female connector (10) according to claim 1, wherein the conductive pin (13) is an elastic pin with a built-in spring.

4. The female connector (10) according to claim 1, wherein the first alignment and holding mechanism (12) comprises a plurality of magnets, and the plurality of magnets are arranged at a front end of the first insulating base body (11) corresponding to a periphery of the receptacle (14).

5. The female connector (10) according to claim 1, wherein the first insulating base body (11) is configured as a long strip structure, a reception direction of the female connector (10) by the corresponding male connector (40) is arranged to be perpendicular to a long side of the first insulating base body (11), and the receptacle (14) is arranged in a middle of a front end of the first insulating base body (11).

6. A male connector (40) for photoelectric hybrid in free space of magnetic absorption, comprising:

a second insulating base body (41) having a plug-in convex portion (42) formed at a front end of the second insulating base body (41), wherein the plug-in convex portion (42) is configured to match a receptacle (14) of a corresponding female connector (10);

an electrical contact (43) and a second optical communication module (45) provided at a front end of the plug-in convex portion (42); and a second alignment and holding mechanism (47) provided on the second insulating base body (41), and configured to align the male connector (40) and a corresponding female connector (10) through a magnetic field before plugging and remain the male connector (40) and the corresponding female connector (10) in a plug-in state through the magnetic field after plugging;

wherein, the second optical communication module (45) comprises:

a second optical fiber connector (451) for carrying optical fibers; and a second lens (452) provided at a light-emitting end of the second optical fiber connector (451) and configured to expand a light beam transmitted from the male connector (40) to the corresponding female connector (10), wherein a position of the second lens (452) is arranged in the plug-in state such that a certain spacing (D) is provided between the second lens (452) and a first lens (152) of the female connector (10);

wherein the second optical communication module (45) is arranged in a center of the front end of the plug-in convex portion (42), the electrical contact (43) comprises a first set of contacts and a second set of contacts, the first set of contacts and the second set of contacts are symmetrical with respect to the second optical communication module (45), and the second set of contacts are configured to carry a same signal as the first set of contacts.

7. The male connector (40) according to claim 6, further comprising:

a plurality of second positioning rods (46) arranged on the second lens (452) and the second optical fiber connector (451) from different positions and configured to align the second lens (452) and the second optical fiber connector (451); and a guiding and matching part (44) for guiding the first lens (152) to align with the second lens (452).

8. The male connector (40) according to claim 6, wherein the second alignment and holding mechanism (47) comprises a plurality of magnets, and the plurality of magnets are arranged at a front end of the second insulating base body (41) corresponding to a periphery of the plug-in convex portion (42).

9. The male connector (40) according to claim 6, wherein the second insulating base body (41) is configured as a long strip structure, an insertion direction of the male connector (40) into the corresponding female connector (10) is arranged to be perpendicular to a long side of the second insulating base body (41), and the plug-in convex portion (42) is arranged in a middle of a front end of the second insulating base body (41).

* * * * *